(12) United States Patent
Bayer et al.

(10) Patent No.: US 8,002,254 B2
(45) Date of Patent: Aug. 23, 2011

(54) BAYER WORK PIECE CLAMPING SYSTEM

(76) Inventors: Jack Leon Bayer, Phoenix, AZ (US);
Scott Leon Bayer, Scottsdale, AZ (US)

(\*) Notice: Subject to any disclaimer, the term of this patent is extended or adjusted under 35 U.S.C. 154(b) by 1165 days.

(21) Appl. No.: 11/787,341

(22) Filed: Apr. 14, 2007

(65) Prior Publication Data

US 2007/0262507 A1 Nov. 15, 2007

Related U.S. Application Data

(60) Provisional application No. 60/800,321, filed on May 15, 2006.

(51) Int. Cl.
*B23Q 3/00* (2006.01)

(52) U.S. Cl. ............ 269/305; 269/20; 269/43; 269/45; 269/900

(58) Field of Classification Search .............. 269/20, 269/32, 56, 47, 301, 300, 309, 900, 305, 269/43, 45
See application file for complete search history.

(56) References Cited

U.S. PATENT DOCUMENTS

| | | | | |
|---|---|---|---|---|
| 4,174,828 | A * | 11/1979 | Bergman | 269/34 |
| 4,445,678 | A * | 5/1984 | George | 269/88 |
| 5,060,920 | A * | 10/1991 | Engibarov | 269/282 |
| 5,931,726 | A * | 8/1999 | Peters | 451/305 |
| 6,126,158 | A * | 10/2000 | Engibarov | 269/136 |
| 7,156,384 | B1 * | 1/2007 | Varnau | 269/25 |
| 7,712,401 | B1 * | 5/2010 | Greenwald | 82/112 |
| 2002/0153650 | A1 * | 10/2002 | Sawdon et al. | 269/20 |
| 2007/0262507 | A1 * | 11/2007 | Bayer et al. | 269/305 |

\* cited by examiner

*Primary Examiner* — Lee D Wilson

(57) ABSTRACT

This patent pertains to a work piece clamping system with manual or powered clamping. Work piece locations of all three axis can be determined from the device. Various clamping devices can be included in the system. Single or multiple work pieces of various sizes and shapes can be clamped.

16 Claims, 18 Drawing Sheets

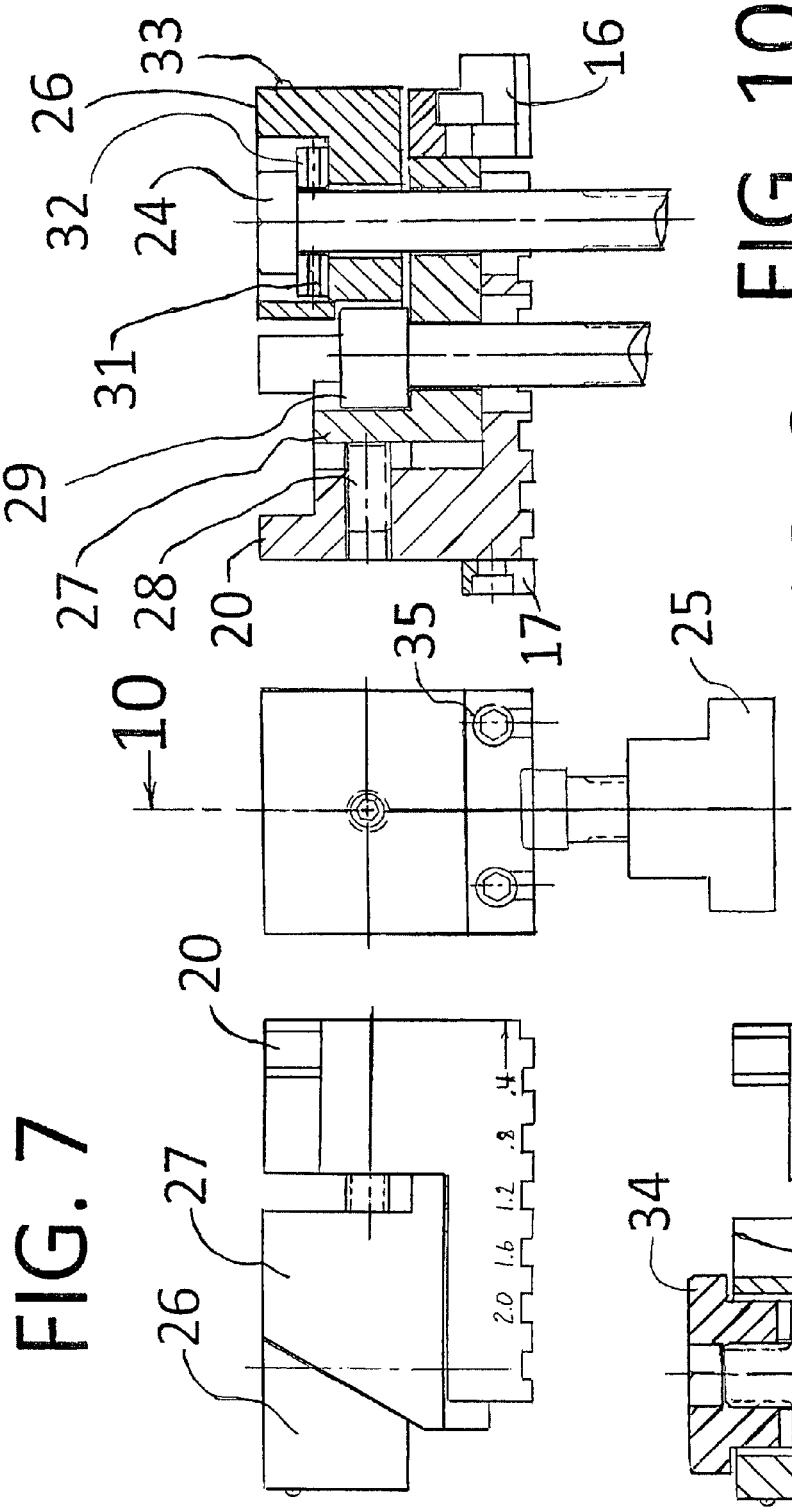

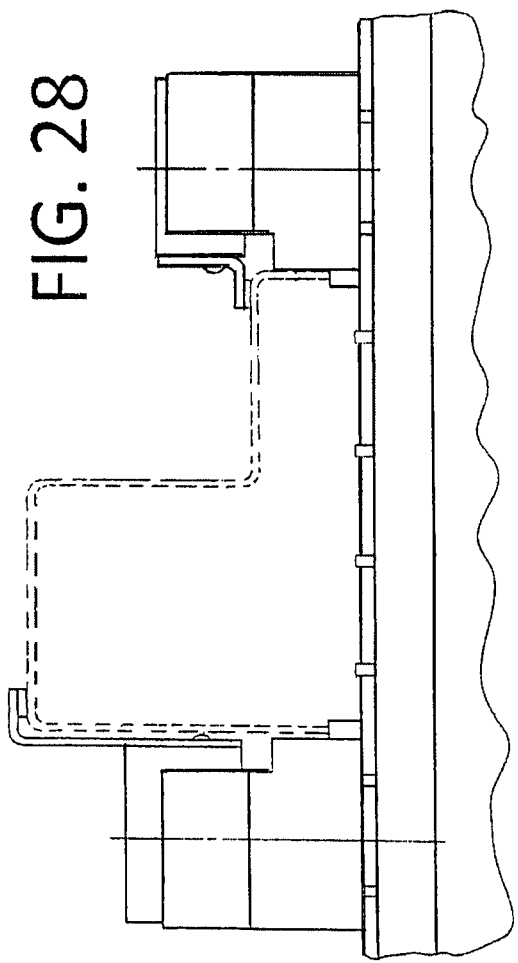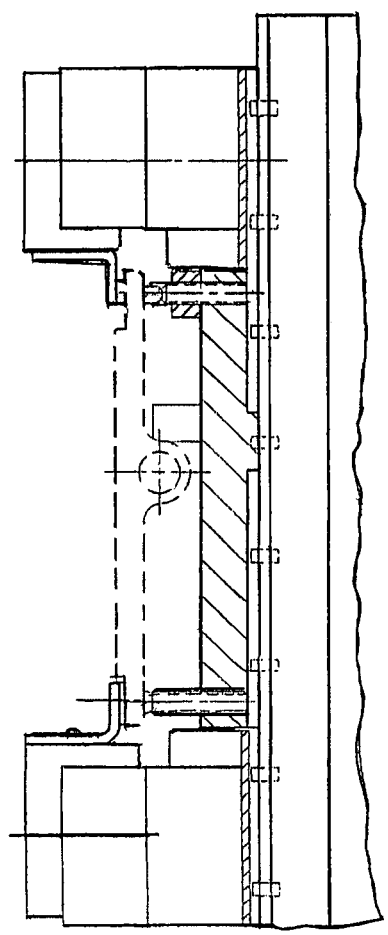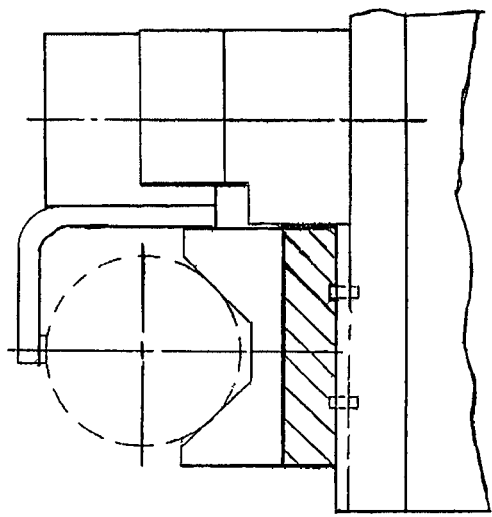

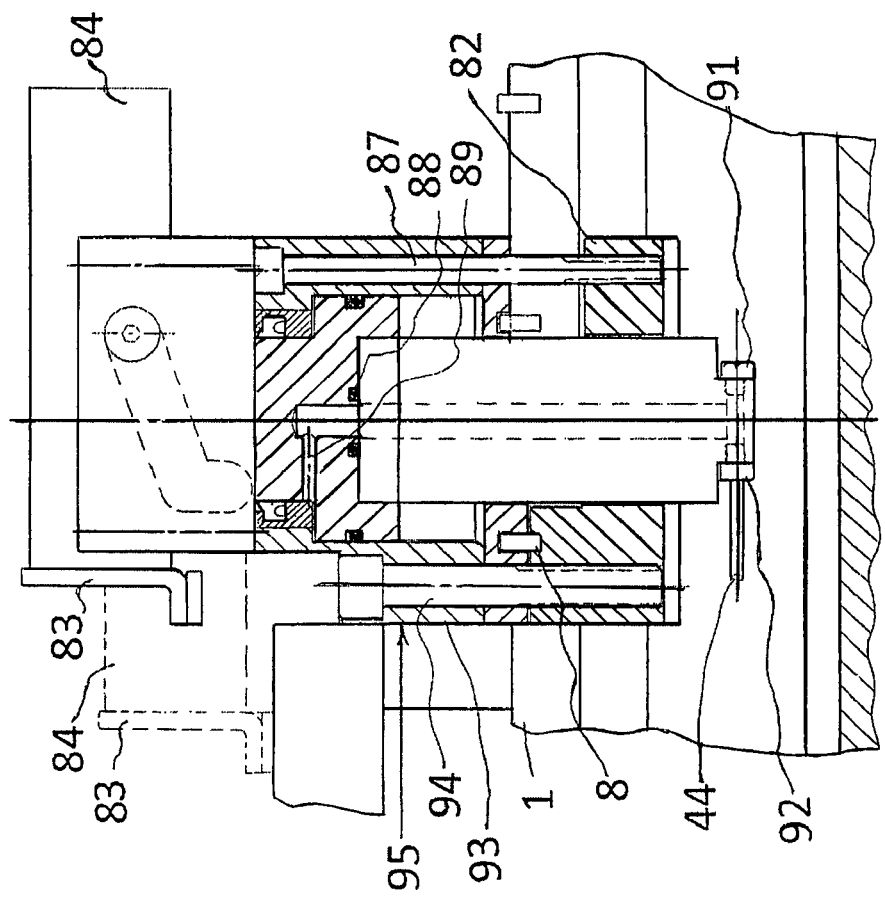
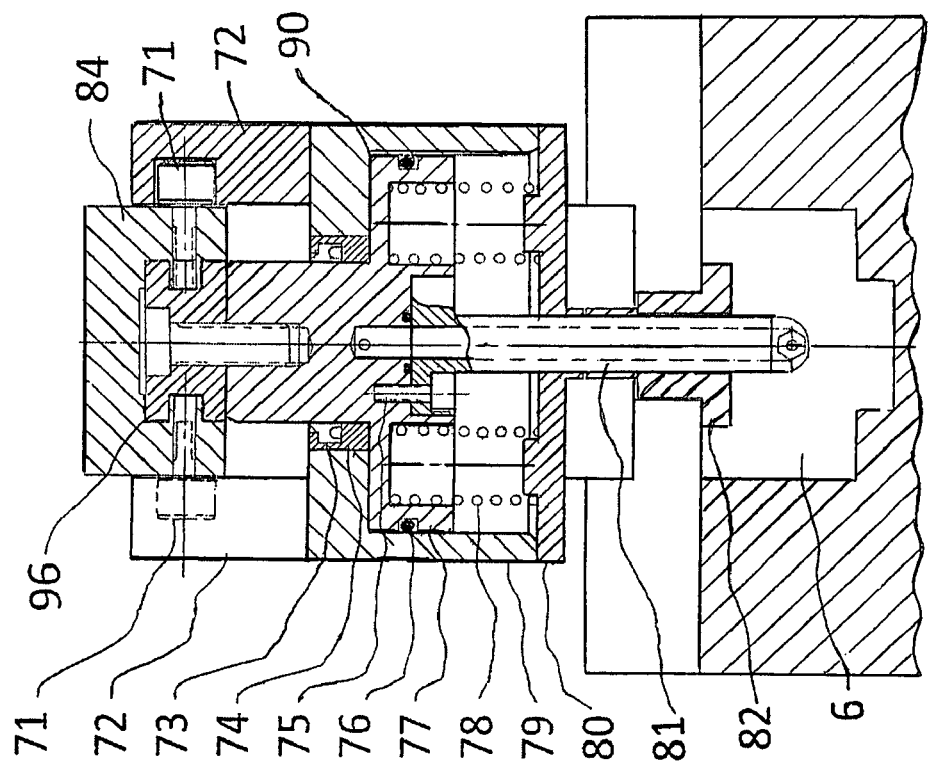
FIG.31
FIG.30

BAYER WORK PIECE CLAMPING SYSTEM

RELATED APPLICATIONS

This patent relates to a Provisional Patent Application filed 11/10/2004. (Application Ser. No. 60/626,431)

This application varies from the preference application in the following ways:

The grooves located along the T-shots in the pallet are spaced a greater distance apart. Hardened keys are permanently fixed to these grooves and project above the surface to engage one of many grooves located in a clamping and/or locating device.

The grooves located in the locators are larger and spaced a greater distance apart than described in the first referenced application.

Since the slots in the bases and locators are further apart, the incremental positioning of the locators along the T-slot is much greater.

Since this incremental distance exceeds the practical maximum travel of the wedge clamp, means are provided to pre-adjust the clamping wedge to provide the optimum wedge clamping travel. The optimum clamping travel must provide enough displacement to account for the width tolerance of the work piece to be clamped plus any deflection encountered by the clamping force plus a small clearance to allow placement and removal of the work piece in the unclamp position.

Since the wedge clamp depends on vertical force and displacement to provide horizontal force and displacement to clamp the work piece, the vertical height of the wedge in the clamped condition can be controlled by the pre-adjustment of the wedge. This is particularly important when the work piece to be clamped is very thin.

The base grooves are marked with their location from a zero reference point. Location grooves are marked with their distance from the work piece location surface. Adding or subtracting the locations of the base locator as marked at the key engagement, provides the work piece location from zero reference.

A second provisional application was filed May 15, 2006 (application Ser. No. 60/800,321). The present non provisional patent application includes additional features not found in either provisional application.

BACKGROUND OF THE INVENTION

1. Field of the Invention

This patent relates to work piece holding devices used to hold work pieces for machining or other purposes. Work pieces that are machined must be held or clamped to prevent their movement caused by forces acting against them.

It is generally desirable to have a high degree of rigidity and accurate work piece location so that the surfaces which are treated (usually by cutting) on the work piece is well within acceptable tolerance.

2. Description of Prior Art

Existing work piece holding devices range from a simple vice designed to hold one work piece, wedge lock side clamping of single or multiple work pieces located on a single base and dedicated fixtures constructed for a specific work piece.

Vertical hold down clamps (called swing down clamps) are available for clamping work pieces against their top surface. They swing out of the way when unclamped to permit removal of the work piece.

Exiting wedge clamps are generally fixed to a base with serrations or keys that are difficult to clean and difficult to determine the exact work piece location.

They generally require manual clamping.

Swing down clamps are generally located on dedicated fixtures. They are usually powered by hydraulic systems. Their hydraulic lines tend to collect chips and are difficult to clean.

Power clamping is usually accomplished using hydraulic systems. This complicates the systems need for decoupling the hydraulic lines when the clamping system is removed from a machine tool for off machine work piece handling.

SUMMARY OF INVENTION

This patent relates to a work piece holding system that provides rigid, powerful and accurate clamping of various sizes and shapes of work pieces. Work piece location in all three axes is easily read from the system. Power lines are located in channels below the clamping surface. Cleanliness is maintained by protective covers. Various clamps, (wedge and slide down) are used in a single system.

BRIEF DESCRIPTION OF THE DRAWINGS

FIG. 7 is a side view of the locator/clamp.

FIG. 8 is the same as FIG. 7 but showing a pre-clamp hand knob.

FIG. 9 is an end view of the locator/clamp showing a nut used for manual clamping.

FIG. 10 is a section taken through FIG. 9 showing detail of the locator/clamp.

FIG. 27 shows varying work pieces clamped with vertical force.

FIG. 28 shows varying work pieces clamped with vertical force.

FIG. 29 shows varying work pieces clamped with vertical force.

FIG. 30 shows a section taken through FIG. 26 showing details of a power clamp that retracts to allow a work piece to be placed and then extends over the work piece and moves down to clamp the work piece with vertical force.

FIG. 31 is a section of locator/slide down clamp taken from FIG. 26

DESCRIPTION OF THE PREFERRED EMBODIMENT

Figure 1:
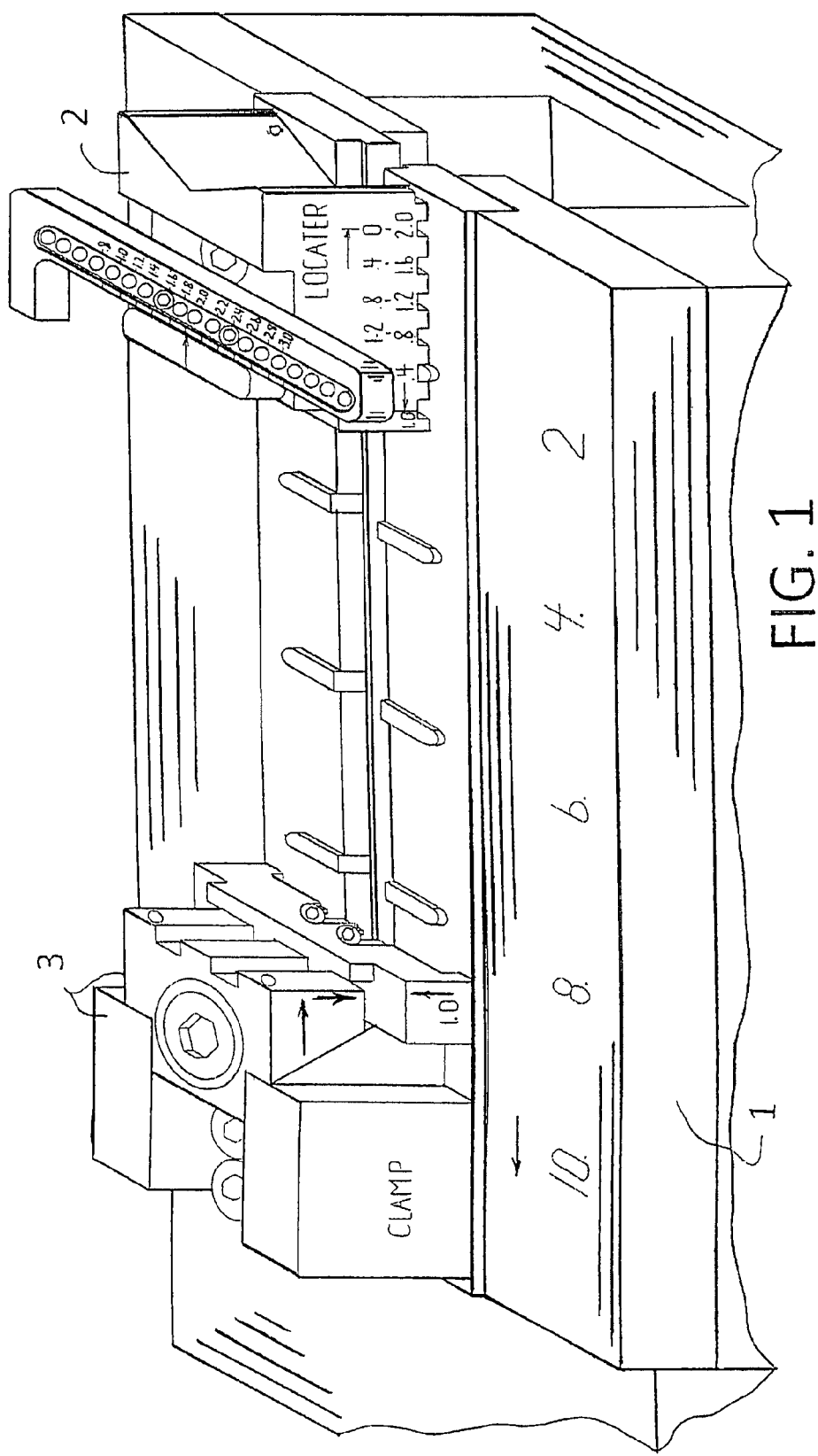
FIG. 1 is a view showing a single station base showing a device for locating a work piece in 3 axes and a device for clamping the work piece against the locator.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The clamping system consists of three basic parts. These parts are identified by FIG. 1. A base 1, a locator 2, and a clamp 3. The base is used to support and locate the locator, and support the clamp, and contain a power actuator 55 FIG. 14 or manual clamping nut 25 see FIG. 9.

Figure 2:
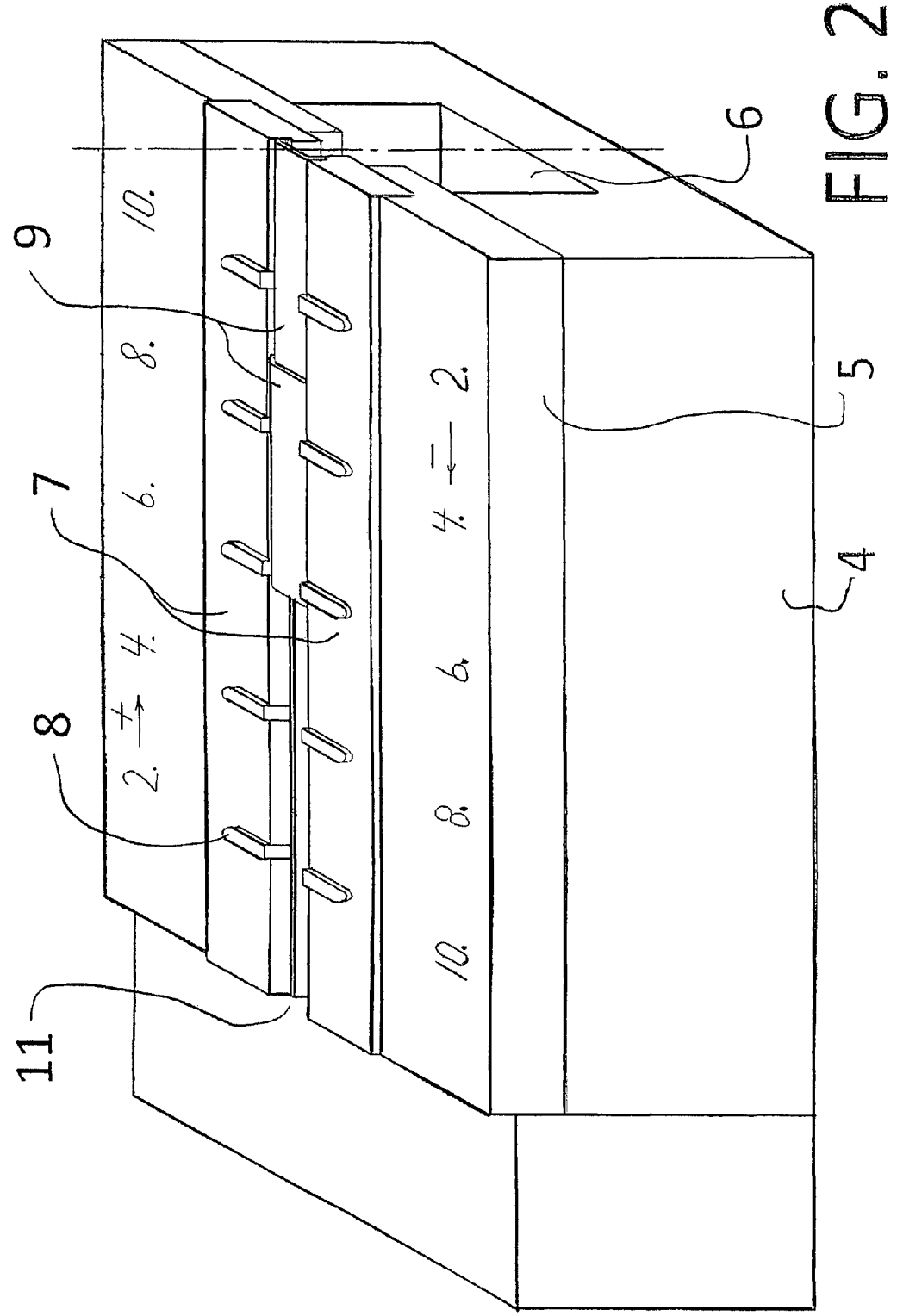
FIG. 2 is a view showing the basic parts of a single station base.

The base FIG. 2 consists of a supporting structure 4 which is underneath said base 1, rails 5, used to partially enclose a large channel 6 in the structure and support wear resistant rails, 7, provided with precisely located keys 8 used to locate the locators.

FIG. 2 slot covers 9 may be sprung into recesses located in wear resistant rails 7, cover the T-SLOTS 11, FIG. 2 to prevent foreign matter from entering the channel 6. Two overlapping covers 9 may be used to cover the distance needed between the clamps and locators. Multiple sets of various length covers 9 are needed to cover the full range of possible lengths.

FIG. 2 shows a single T-slot 11, identified as a station. Any number of stations on a single plane or multiple planes can be provided. See FIGS. 19, 20, and 21. The bases, locators, and clamps are configured in various ways to provide clamping for a wide variety of parts. Furthermore, the clamps and locators are configured to enable one part or multiple parts to be clamped on a single station. The bases are configured with a single side, FIG. 1 or multiple sides FIGS. 15, 16, and 21.

Figure 3:
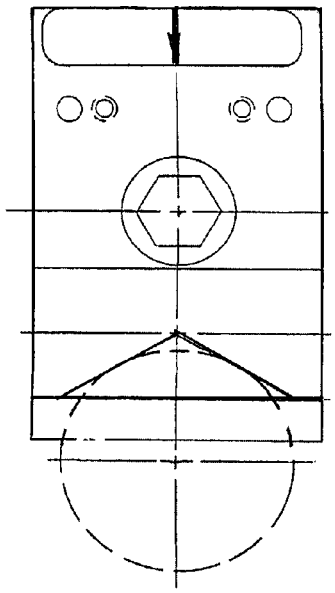
FIG. 3 is a top view of the work part locator.
Figure 5:
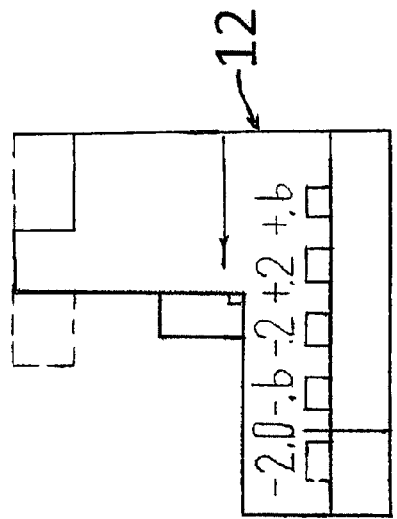
FIG. 5 is a side view of a work piece locator reduced in length.
Figure 4:
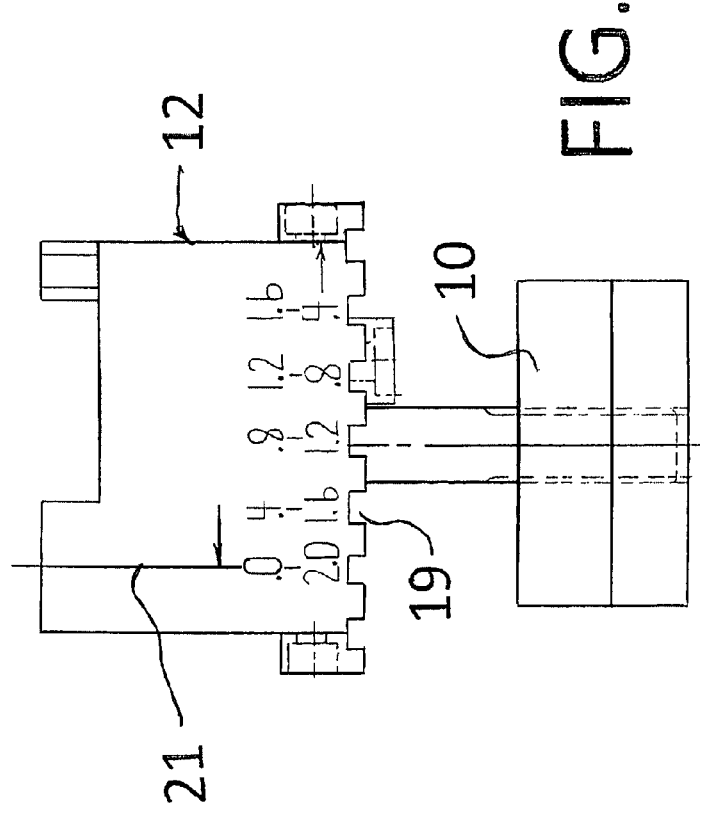
FIG. 4 is a side view of the locator.

The locators are configured with a single locating surface FIG. 5, and double ended FIG. 3 and FIG. 4 enabling round, hex, or flat parts to be located. The locators are also combined with clamps 18 FIG. 6 and FIG. 7 to enable more parts to be located on a single station by reducing the clamp and locator length.

The locators FIG. 4, FIG. 5 are provided with slots 19 that are accurately located from the work piece locating surface 12. The slot locations are clearly marked on both sides of the locator.

The keys 8 located in the wear resistant rails 7 FIG. 2 are clearly marked with their location from a zero reference location near the end of the base.

When the locator is mounted to the base, one set of aligned keys 8 in the base will engage one set of aligned slots 19 in the locator. To determine the part location from zero reference, add the indicated location of the engaged key on the base to the indicated location of this key as marked on the locator.

The arrows marked on the base and locator must be pointed in the same direction when addition is used. Otherwise subtraction must be used.

Either or both ends of the base may be assigned as zero reference and marked with two rows of dimensions, each value ascending from its zero reference point. This allows the locator to be rotated to locate work pieces from their opposite side. Since the arrow directions of the base and locator will coincide on one side of the locator, addition may be used to calculate the distance from reference zero regardless of the locator orientation.

The locator FIG. 4 can be used to locate round or hex work pieces. The top set of numbers on both sides of the locator FIG. 4 identifies the intersection point of the angled locating surfaces 21 from the locator slots. To find the distance from the center of a round or hex work pieces from zero reference; add the location of the key as marked on the base to the location of the slot engaged by the key as marked by the top numbers on the locator. Add this addition to the product of the round work piece diameter or the hex cross flats dimension times 0.57735. As before, the arrow directions must coincide and zero reference may be assigned to either or both ends of the base. The locator is clamped against the wear rails by a bolt and T-nut 10.

Figure 6:
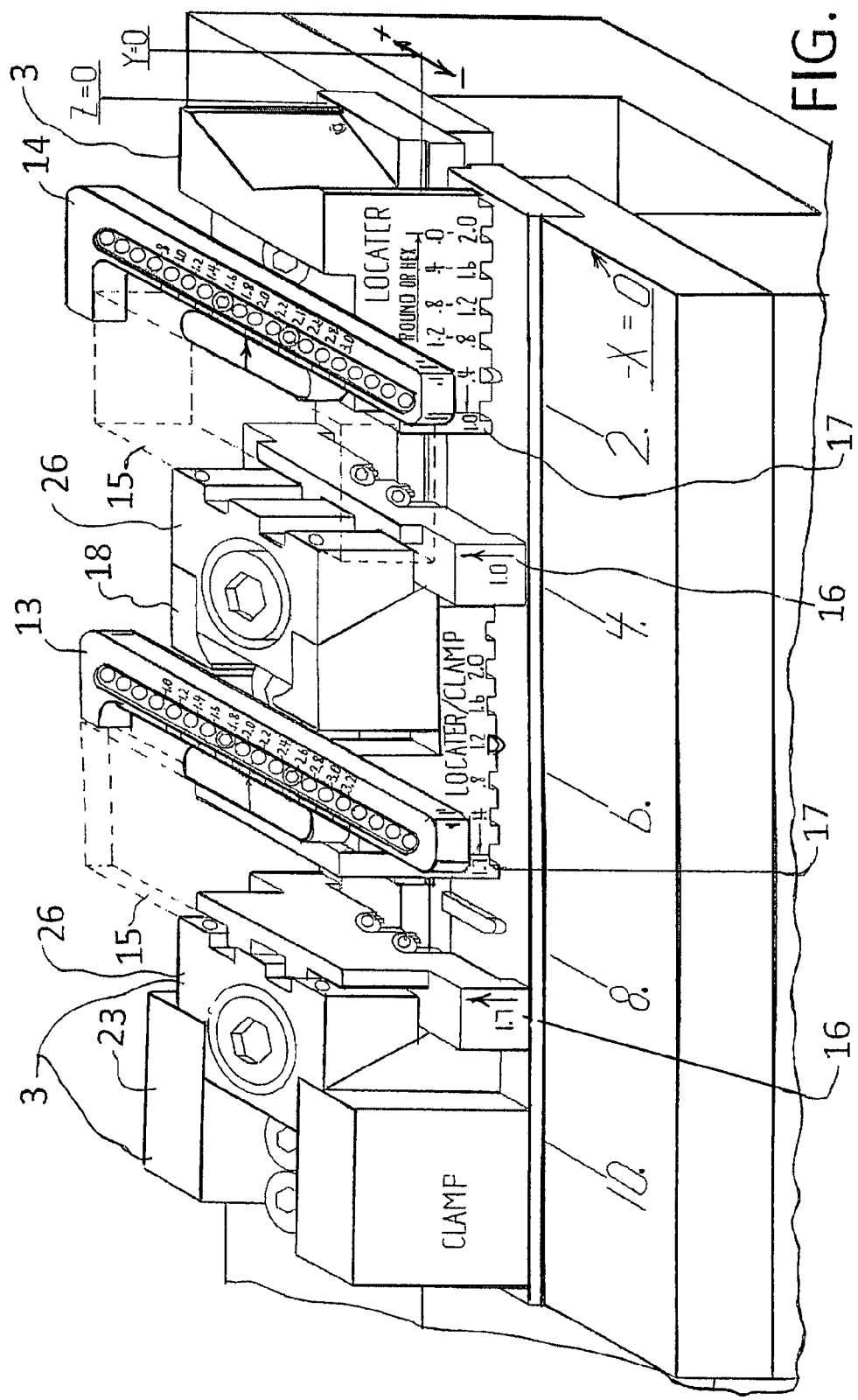
FIG. 6 is the same as FIG. 1 with the addition of a combined locator and clamp. It is used when two or more work pieces are clamped on the same station.
Figure 11:
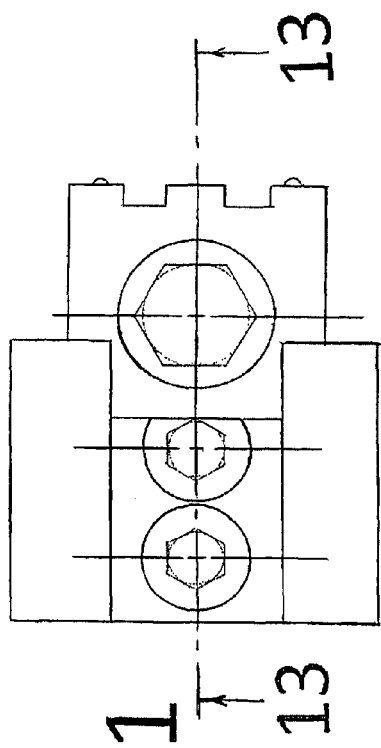
FIG. 11 is a top view of a wedge clamp.
Figure 12:
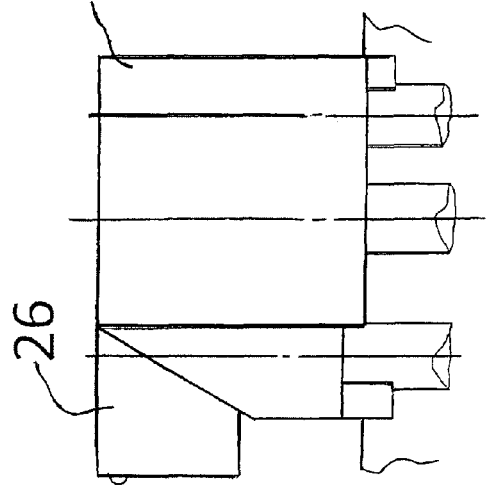
FIG. 12 is a side view of the wedge clamp.

A wedge clamp 3 is shown mounted to a base FIG. 6 and is further described by FIG. 12. This clamp consists of a taper wedge 26 that is forced against a tapered surface contained by a clamp housing 23. This causes the wedge to move parallel to the base to clamp a work piece 15 against a locator and move down to force the work piece against a clamp spacer 16, FIG. 6 used to locate the work piece above the base. The wedge is manually forced against the tapered surface by rotating a threaded rod 24 FIG. 10 into a threaded nut 25. Alternatively, the wedge may be vertically displaced by a powered actuator FIG. 14 located in the channel 6 contained in the base FIG. 2.

Figure 13:
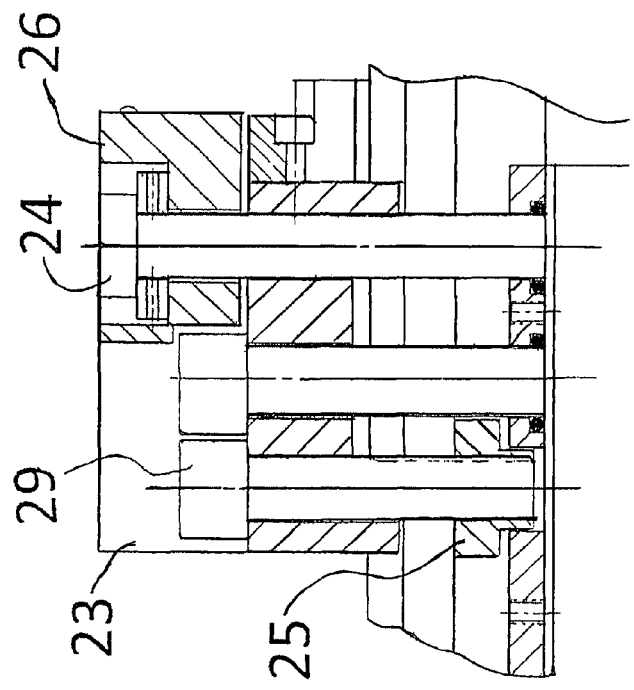
FIG. 13 is a section taken through FIG. 11.

The clamp housing 23 FIG. 13 is accurately guided along the wear resistant rails by T-slots 11 located between the rails. One or more bolts 29 are used to prevent the clamp housing movement caused by the clamping forces. The clamp housing 23 is relieved on the bottom to allow its location to be adjusted along the rails with out interference from the keys located on the wear resistant rails.

A combination clamp/locator 18 is shown by FIG. 6, and further described by FIG. 10. In this case, a locating surface is provided on one end and a wedge clamp is provided on the other end. The locator housing 20 is fixed and its location dimension is measured as described for a locator.

The wedge location is adjusted with respect to the locator housing to compensate for relative large incremental positioning of the locator and relatively small travel of the wedge clamp. The wedge 26 is forced against a tapered surface of wedge housing 27 contained by the locator housing 20. The wedge housing is located and retained by an adjusting screw 28. The wedge housing and locator housing are bolted to each other and the base by one or more bolts 29. The wedge is forced against the wedge housing taper by a threaded rod 24 either by manual rotation or vertical displacement by a power actuator. Thrust bearing 31 and 32 may be used with the wedge clamp or locator/clamp to reduce the manual torque required to achieve the desired wedge clamping force.

Spring plungers 33 are located in the wedge to retain work pieces before and after clamping A hand tightening nut 34 FIG. 8 may be used to increase the part retention force to prevent heavier work pieces from falling from the clamping device before and after clamping. This is most needed when multiple work pieces are simultaneously clamped and unclamped.

FIG. 6 spacers are used to locate work pieces above the wear rails. The clamp spacers 16 are bolted 35 to a clamp housing 12 or a wedge housing 23 FIG. 12 as applicable. The clamp spacers are configured with extensions that project into slots provided in the wedge 26. This is necessary to assure that work pieces are fully supported at the line of contact with the wedge so the down ward wedge force does not tip the work piece. The clamp spacers 16 are relieved at the center to prevent interference with the keys 8. The locater spacers 17 are bolted to the locator as shown. All spacers are marked to indicate their height above the wear rails.

Gauges 13 and 14 are used to locate work pieces from the T-slot 11 center FIG. 2. FIG. 6 gauges are numbered on both sides with their distance from their work piece locating surface to the center of the T-slot. The gauges are incrementally fixed to the locator or locator housing by pins and bolts as shown. Other means such as keys, serrations, etc. may be used for this purpose.

The gauge may be placed to locate work pieces from either side of the T-slot. This is the purpose of numbering both sides of the gauge to determine the work piece location from zero reference on either side of the T-slot. Add or subtract the gauge stop location to the T-slot location depending on which side of the T-slot that the gauge is extended.

The T-slot zero reference may be located from the center of rotation of a rotary base where applicable to facilitate machine programming with respect to the center of rotation of the work piece.

The stop gauge 14 distance from the T-slot centerline is indicated by the number aligned with the arrow located on the locator housing.

An alignment gauge 13 may be used as above with the exception that a work piece surface is visually aligned with a gauge surface for providing location. This enables machining a work piece surface that would otherwise be obstructed by the stop gauge.

Figure 14:
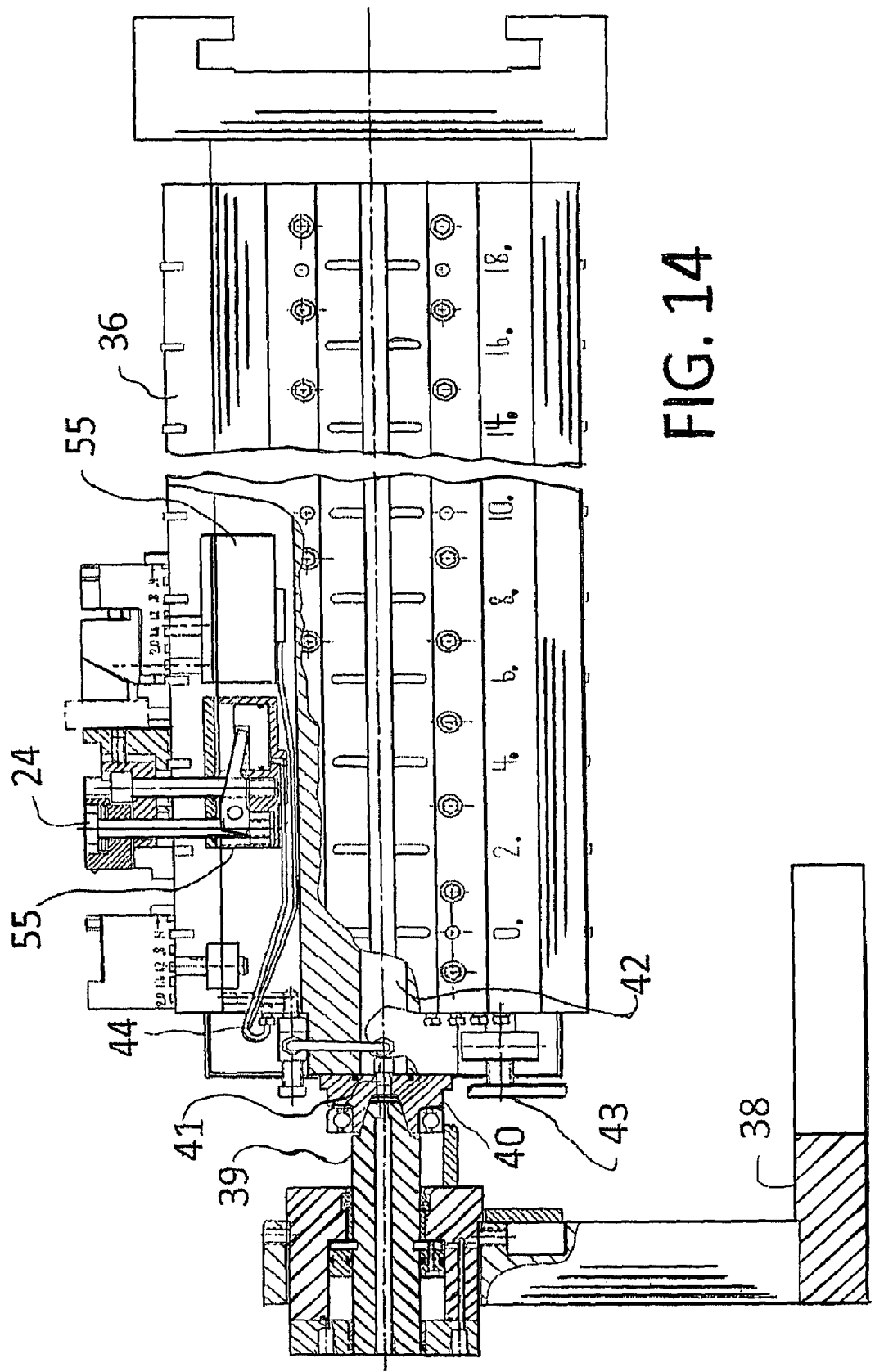
FIG. 14 is a view and partial section taken through view 15. It shows a log with locator/clamps and locator and a power actuator supplied with compressed air conveyed through a tale stock piston and stored in the log.
Figure 21:
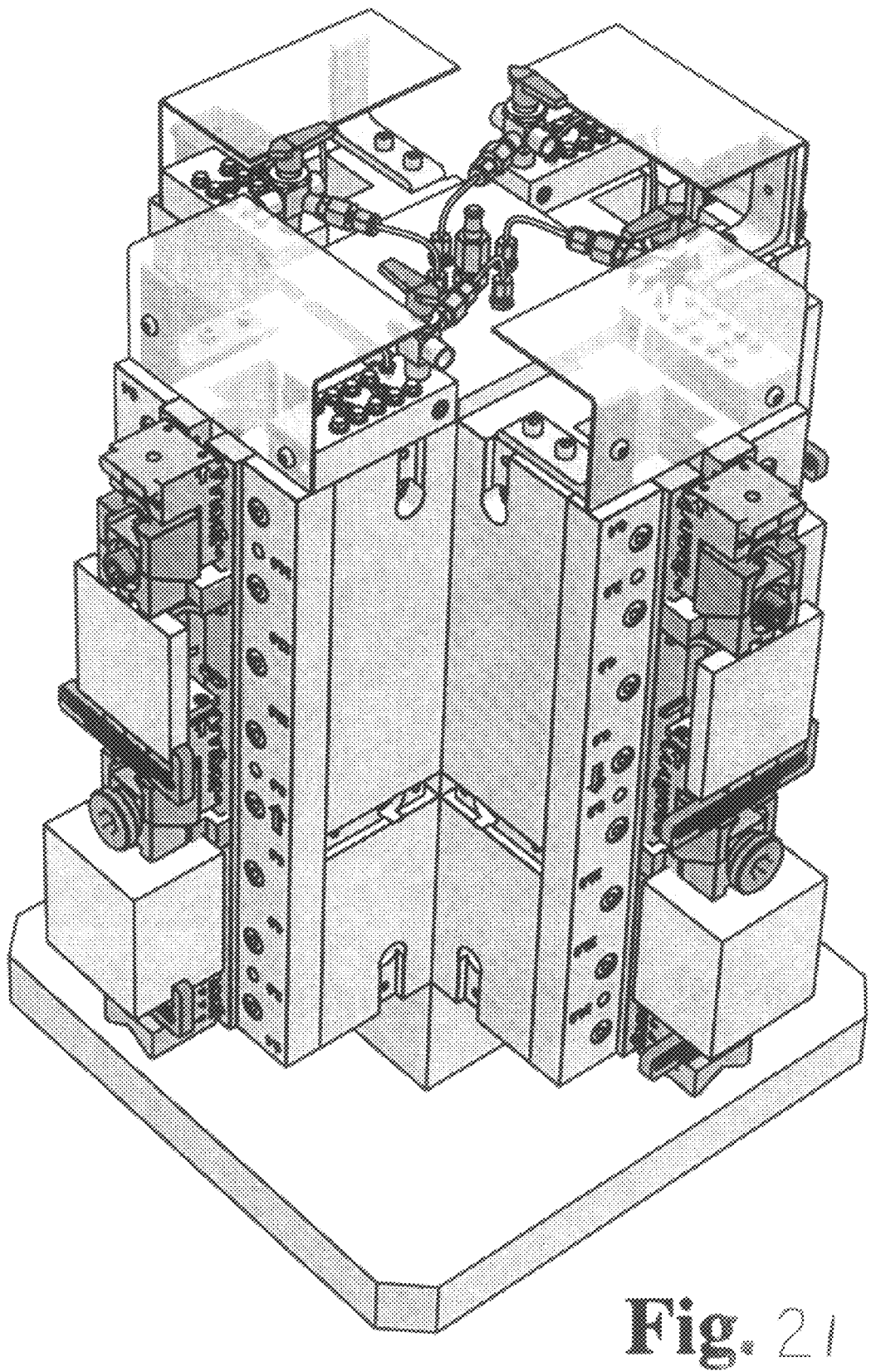
FIG. 21 is a view of a four sided clamping systems mounted on a tombstone.

Multi face bases are called tombstones FIG. 21 when fixed at one end and logs 36, FIG. 14 when fixed at both ends. The work pieces require independent clamping for each log or tombstone face to prevent the work pieces from falling from one face when rotated to load/unload work pieces on another face.

Figures 15, 16:
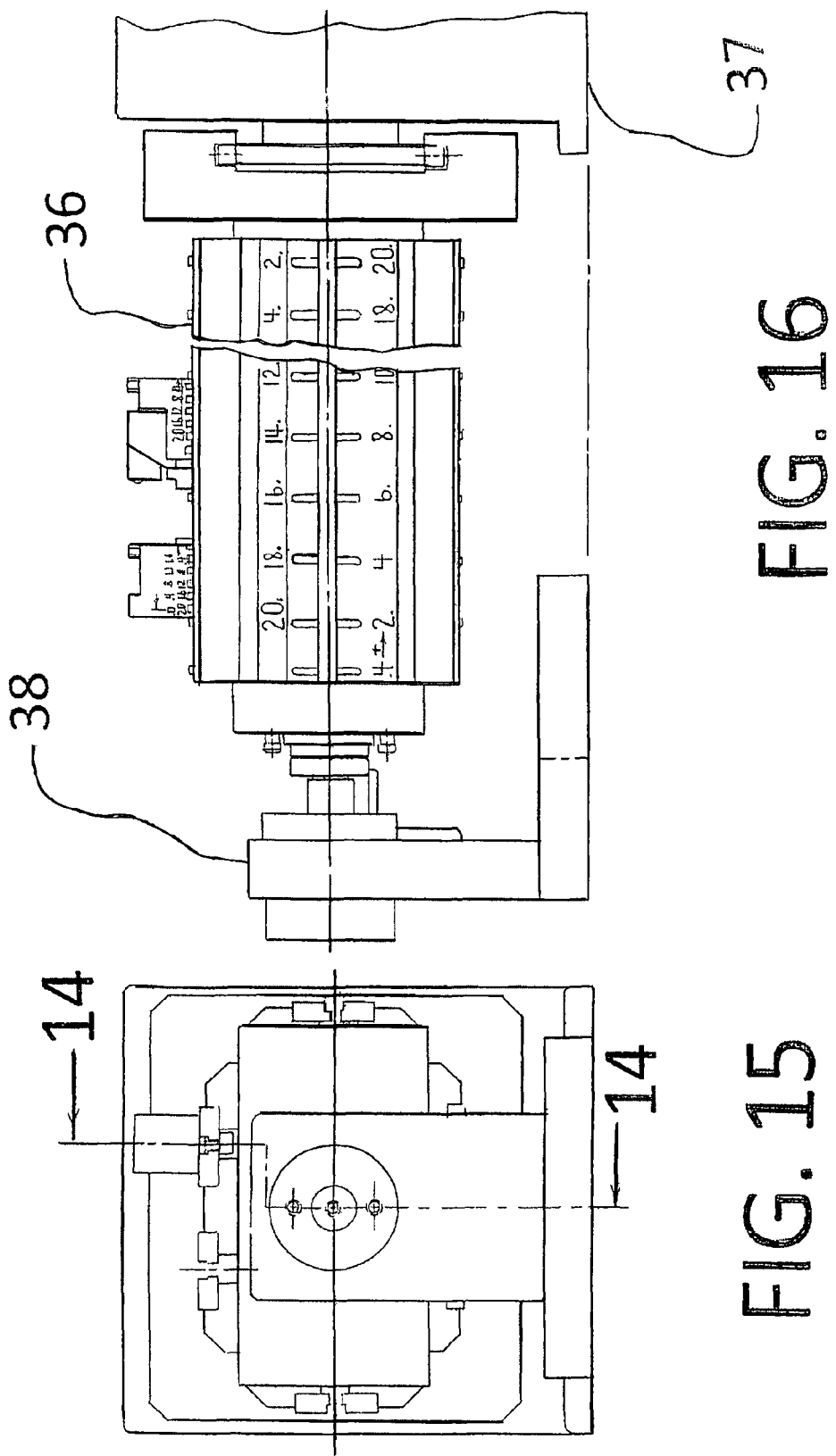
FIG. 15 is an end view of the log mounted to rotary table on one end and supported by a tale stock on the other end.
FIG. 16 is a side view of FIG. 15.
Figure 19:
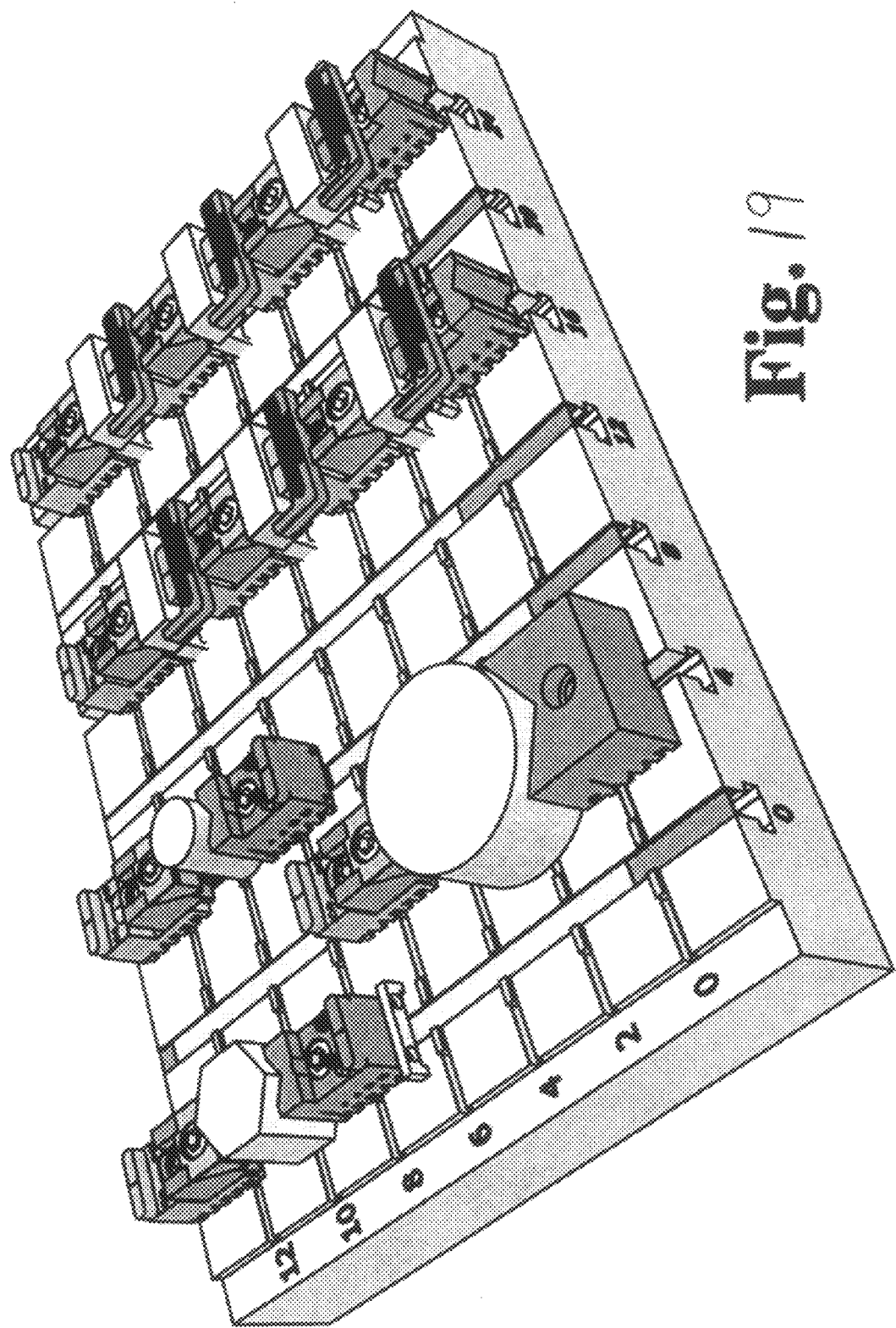
FIG. 19 is a view of a multiple station clamping system.
Figure 20:
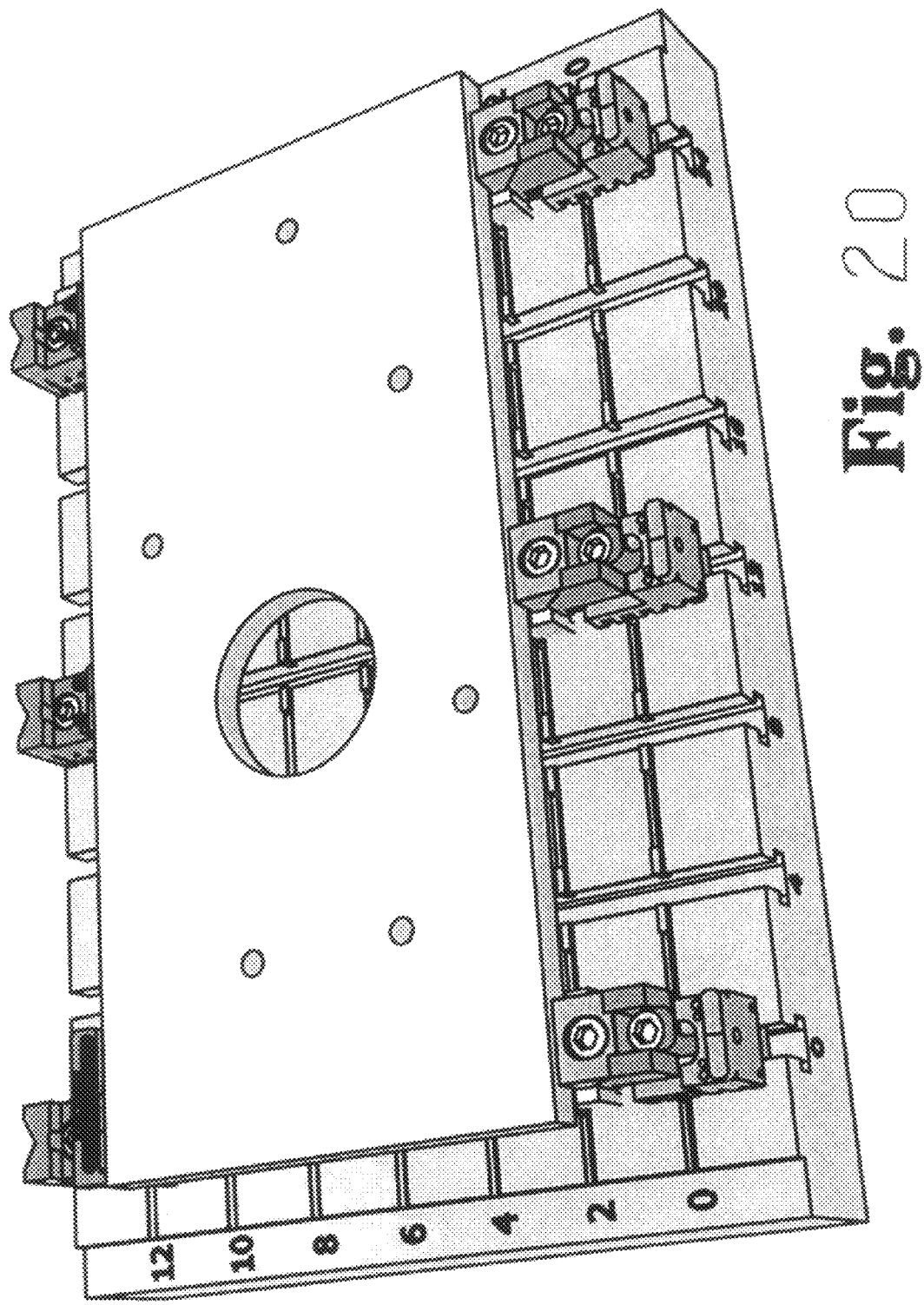
FIG. 20 is a view of another multiple station clamping system showing a single work piece.

FIG. 19 and FIG. 20 shows multiple station clamping systems. These Figs. show manual clamping capability. Power clamping and palletized clamping systems may also be provided with means for removing from the machine for parts loading/unloading or storage, they are called tombstone pallets FIG. 21 or log pallets. FIG. 16 shows a log pallet 36 supported and rotated by a rotary table 37, and supported at the opposite end by a tale stock 38. In this case a single passage for compressed air is completed FIG. 14 when a piston 39 advances and engages a receiver 40 to support the other end of the log pallet. The compressed air flows through the piston 39 and a check valve 41 to fill and trap the air in a storage chamber 42.

Small, flexible air lines 44 are used to convey the compressed air to the actuators from the three way valve 43. These lines are long enough to enable the actuators to be positioned at any location along the station without the need to modify the air line length. Excess air line length can be stored in the chamber or located at the end of the chamber.

Figures 17, 18:
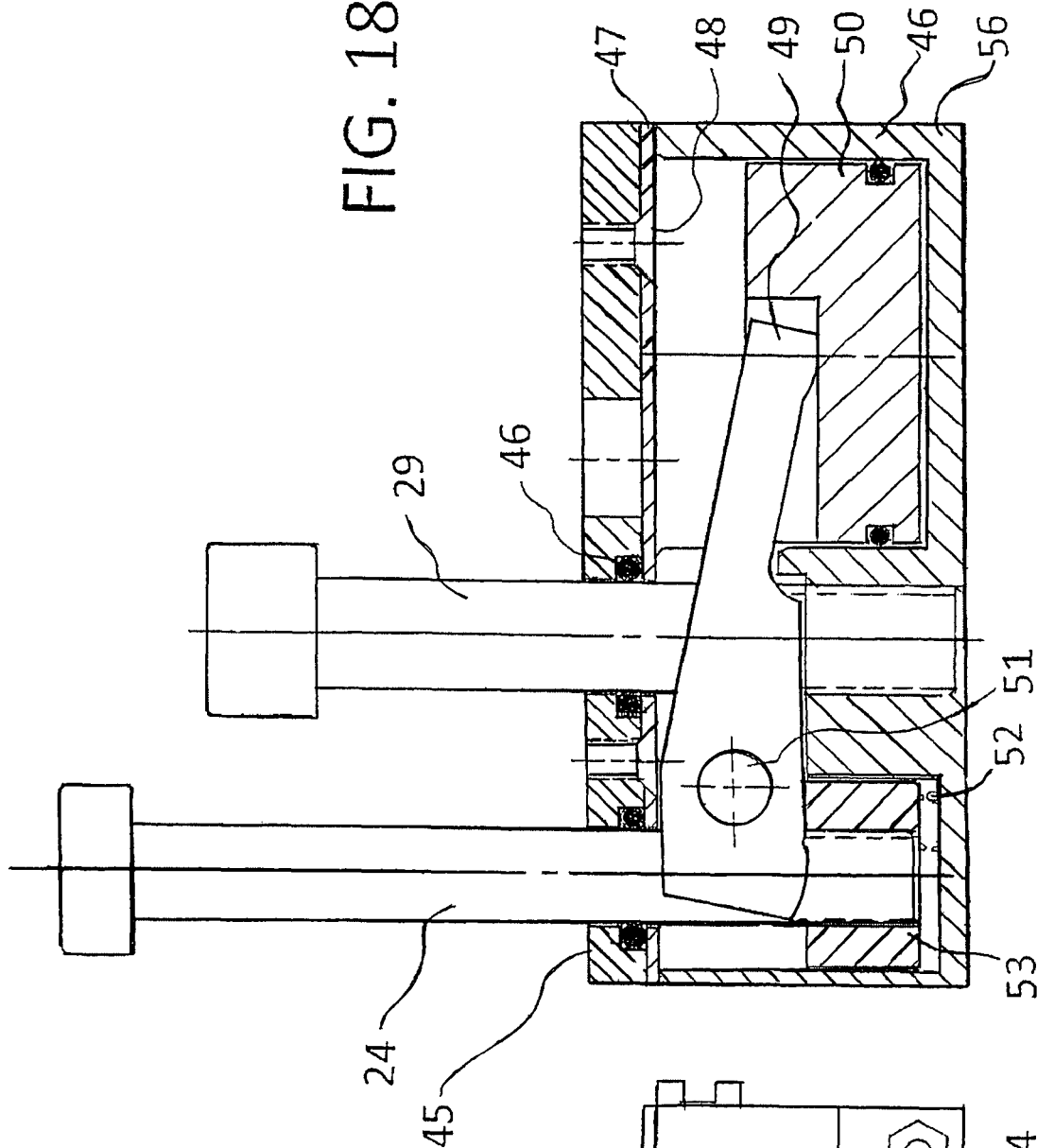
FIG. 17 is an end view of a power actuator used to clamp work pieces.
FIG. 18 is a section taken through FIG. 17 showing means for increasing the clamping force imposed by a pneumatic piston.

The power actuator 55 can be connected to a clamp 3 or locator/clamp 18 FIG. 14. FIG. 18 seals 46, and covers 45 and 47 are bolted 48 to the housing 56 to prevent air from escaping from the piston and prevent foreign matter from entering the actuator 55. FIG. 18 shows the piston 50 acting against the long end of a lever 49 that pivots around a pin 51 and contacts threaded nut 53 on the lever short end. This multiplies the piston 50 force by the ratio between the long and short end lengths of the lever 49. The threaded nut 53 forces the threaded rod 24 down to cause the wedge 26 to slide along a taper surface causing it to clamp a work piece against a locator.

The lever 49 is provided with an oval hole to permit a bolt 29 to pass through and engage threads located in the actuator housing 56. This bolt 29 is used to clamp the actuator to the wedge clamp and clamp/locator.

Power clamping reduces operator fatigue and the time for clamping and unclamping work pieces. Power clamping is often used when pallets are transferred to and from the machine for work piece clamping/unclamping. In this case compressed air is the preferred power source for the following reasons:

1: It is easily transferred from its source to the base. See FIG. 14.
2: When a piston 39 is coupled to a receiver 40, compressed air cleans the mating surfaces
3: If the coupling is not completed, air leakage occurs. This is easily detected by measuring the resulting pressure drop after the normal air transfer duration. This can provide a signal to halt continuance until the condition is corrected.
4: Also, compressed air can be stored in the base and used for off machine clamping/unclamping of work pieces when the air supply is decoupled.

When a three way valve 43 is opened, air flows to all the power actuators located on a single face. This causes the actuator pistons 50 to act against the levers 49 causing the threaded rods 24 to displace the wedges 26 to clamp the work pieces. When the three way valve is rotated to the exhaust position, air flows from the pistons to the atmosphere, relieving the force on the piston and allowing the springs 52 to retract the levers, pistons, threaded rods and wedges to unclamp the work pieces.

Figure 22:
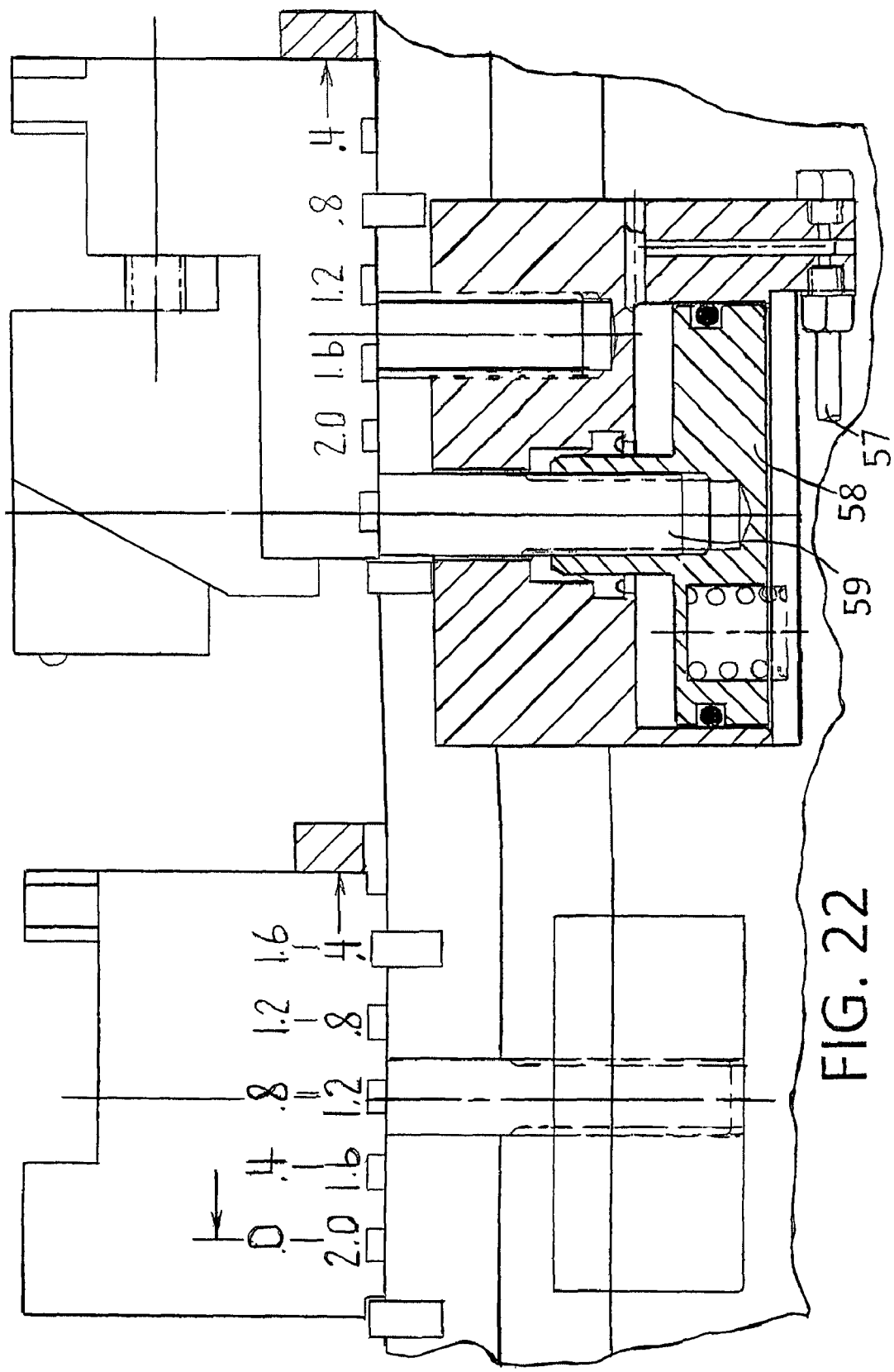
FIG. 22 is a section through the center of an alternate power actuator using hydraulic pressure.

FIG. 22 shows an alternate hydraulic power actuator. The lever used for the air actuator is not required because of the sufficient clamping force is generated by increased hydraulic pressure. Since the hydraulic fluid can not be vented to the atmosphere, two fluid paths are needed, one for flow to the clamp and one to return the flow from the clamp. The higher pressure fluid lines 57 are necessarily larger and less flexible than the air lines. Coupling the fluid lines 57 to and from pallets, and storing the fluid in the bases using spring or pneumatic force is considerably more complicated than required for air clamping.

The hydraulic fluid acts on a piston 58 that retracts a threaded rod 59 to force the wedge against a taper surface to cause clamping. Hydraulic clamping may be a good alternative where pallets are not used and fluid coupling is not needed.

Figure 23:
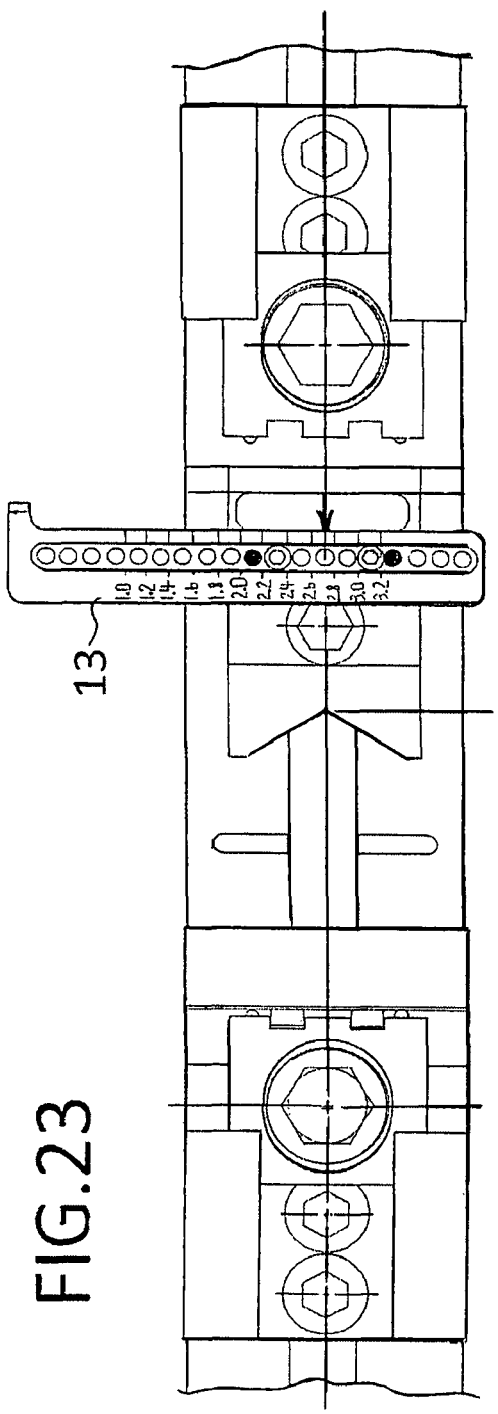
FIG. 23 is a top view of a combination of a locator and wedge clamps used to clamp a sheet metal work piece when the work piece size varies.
Figure 24:
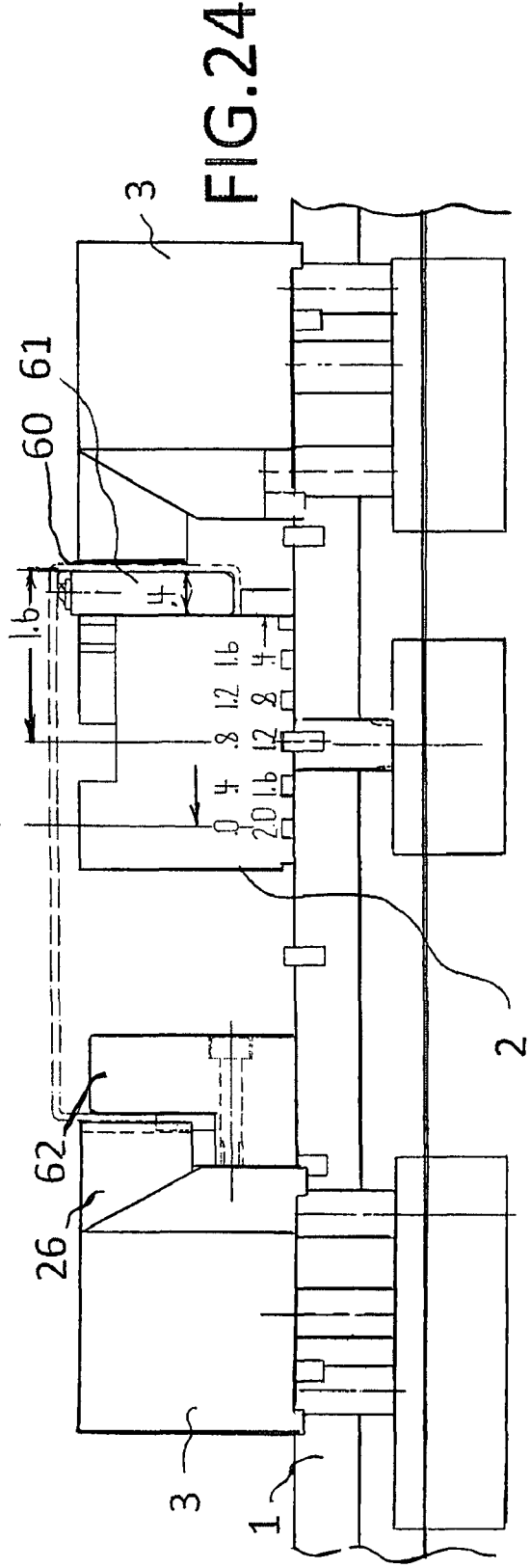
FIG. 24 is a side view of FIG. 23

FIG. 24 shows a locator and two clamps used to clamp the sides of a sheet metal work piece 60. The wedge clamp 3 on the right hand side of FIG. 24 is bolted to the base 1 and used to clamp the work piece against the locator 2. The wedge clamp 3 on the left hand side is allowed to slide along the base 1 so the wedge 26 will position it against the work piece 60 and clamp it against a clamp extension 62. The force on the threaded rod 24, FIG. 13 is used to clamp the work piece and secures the clamp 3 to the base 1. This enables a work piece 60, with great size variation, to be clamped on both ends and secured to the base 1. When the work piece 60 is configured as shown near the locator 2, a spacer 61 may be employed to enable clamping against the locator 2. The spacer 61 may contain a spring plunger 63 that prevents the spacer 61 miss locating before clamping. FIG. 23 an alignment gauge 13 may be used to locate the work piece 60 in the other axis.

Figure 25:
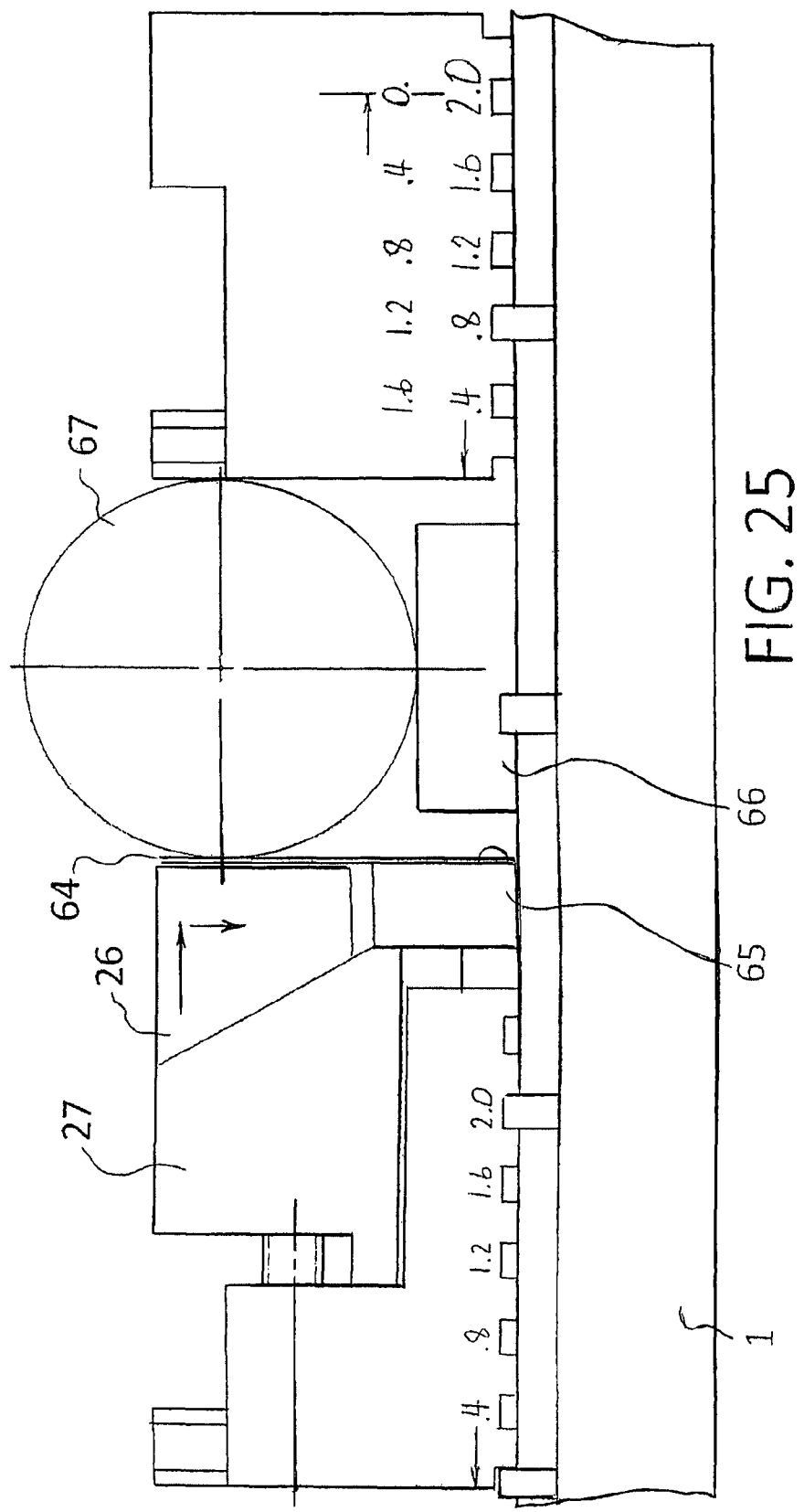
FIG. 25 is a side view of a system for clamping round work pieces.

FIG. 25 shows a means of clamping a round work piece 67 without causing it to rotate as a result of the downward force of the wedge. A flexible band 64 is fastened to the clamp housing 23 or wedge housing 27 FIG. 6 using a spacer 65. The flexible band 64 prevents the downward force of the wedge 26 from acting against the round work piece 67. A spacer 66 is fastened to the base 1 to support the round work piece 67.

Figure 26:
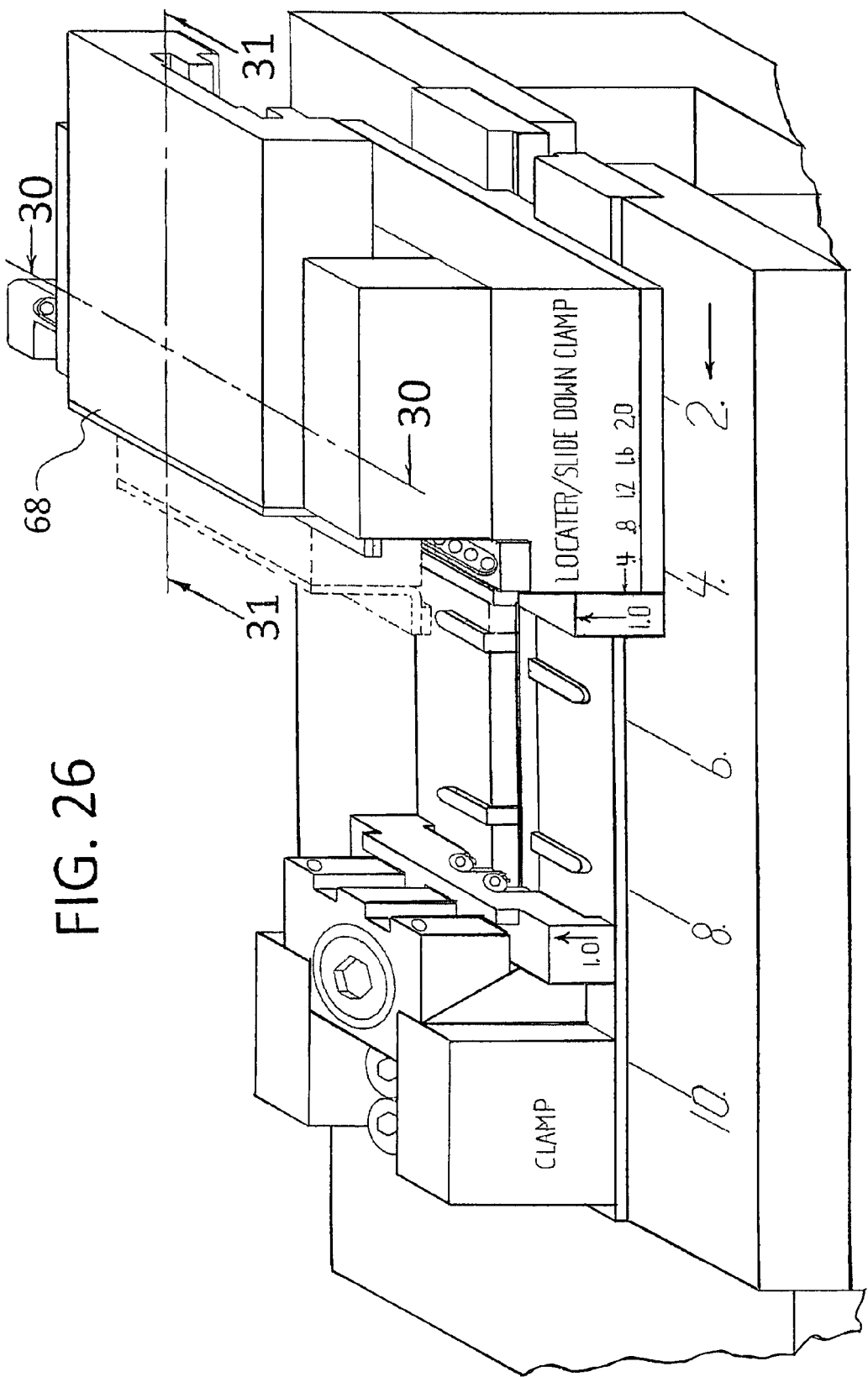
FIG. 26 is a view of a single station base showing a wedge clamp and a locator/slide down clamp used to clamp a work piece with both horizontal and vertical force.

FIG. 26 shows a locator/side down clamp 68. This clamp is used to clamp work pieces by forcing them down against spacers. FIG. 27, FIG. 28, and FIG. 29 show examples of how this clamp is used. FIG. 30 and FIG. 31 show how this clamp works. A piston 77 is contained by a slide down housing 79. The slide down housing 79 is fastened to a slide down cover 80. The slide down cover 80 contains slots that engage keys 8 that are located in the base 1. These keys and the slide down cover 80 slots position the slide down location surface 95 and location markings indicate location as earlier described for locators, FIG. 4.

The piston 77 is fastened to a rectangular bar 81 by fasteners 75. The bar 81 extends into the channel 6 and is guided by a bearing 82. The bolts 87 and 94 clamp the slide down housing 79, slide down cover 80, and bearing 82 to the base 1 when located by a key 8. Seals 76, 88 and 73 prevent air from escaping from the top side 90 of the piston. A guide rail 96 is fastened to the piston 77. A slide bar 84 is keyed to the guide rail 96 and is able to slide left and right as viewed by FIG. 31. Two cam rollers 71 are attached to the slide bar 84 and ride in a slot provided in each side block 72. The slot in each side block 72 is shaped such that when the piston 77 is forced down, the slide bar 84 is forced to the left, as viewed by FIG. 31, and then down. This enables a work piece to be positioned against the slide down locating surface 95 and a spacer 93 when the slide bar 84 is in the unclamped position. A clamp jaw 83 can be fastened to the slide bar 84 and adjusted to clamp the work piece. Various clamp jaw 83 sizes can be selected to adjust to the work piece height.

A bearing 74 is used to guide the top half of the piston 77. Springs 78 are used to retract the piston 77. Air lines 44 are used to transport compressed air to the slide down clamp as described for the actuator 55. See FIG. 14. The air flows through a hose fitting 92, through the rectangular bar 81, into the piston 77 and out a radial hole 89 to the top of the piston 90, FIG. 31. Air may enter the slide down clamp from either side. The un-used port is plugged 91 to prevent escaping air.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A system for guiding and accurately locating various workpieces in three dimensional axeses being x, y, and z comprising;
   a base including a slot with rails on each side of said slot, an underneath supporting structure have a channel aligned with said slot wherein said rails have elongated a plurality of projections located along said rails;
   a movable clamp having a housing including a jaw with a spacer;
   an actuator for moving said movable clamp;
   an adjustable locator having a housing with a plurality of slots on a bottom surface which adjustably engage said elongated projections with said locator having a measuring gage on a top surface which locates and aligns a workpiece; and a T-slot cover excludes foreign matter from the channel.

2. The system according to claim 1 wherein a said rails are wear resistant rail forming a T-slot to guide the clamps and locators, and bolt heads that fasten the wear rails are located on the bottom side of the bars; said projections are keys and accurately located and aligned in the wear rails and used for accurately locating the locators and the spacing between the keys in the wear rails is determined by the spacing and number of engagement slots in the locator so that a continuous and consistent incremental positioning of the locators is possible; the length of the keys in the wear rails is restricted to provide an un-obstructed slide path for the clamps that do not engage the keys.

3. The system according to claim 2 and wherein the location of each key located on the wear rail is marked with indicia.

4. The system according to claim 1 wherein; the movable clamp has a wedge shaped jaw.

5. The system according to claim 4 and wherein said locator has indicia on sides.

6. The system according to claim 4 and wherein; the intersection of two plane surfaces that comprises the angled surface locator is marked as zero on one or both sides of the locator housing and the distance from this location to each key is marked; the center of a round or hex work piece from zero reference can be determined by multiplying the diameter or across flat dimension in inches of the work pieces by 0.57735 and adding to the location of the angled surface intersection from zero reference.

7. The system according to claim 1 and wherein a said locator gage is incrementally pined and bolted to the locator and said locator gage contains multiple holes incrementally spaced and is used to incrementally locate and fasten said top of said locator along an axis perpendicular to the T-slot; said locator gage is provided with either a physical work piece stop used to locate the work piece in an axis perpendicular to the T-slot; and alignment gage is marked with said indicia being at incremental distances from the work piece stop or alignment surface to the center of the T-slot, the alignment gage's incremental distances are marked on both sides to enable said alignment gage to be rotated so that said alignment gage can extend to either side of the T-slot.

8. The system according to claim 1 and wherein the locater has spacers on either of said sides.

9. The system according to claim 4 and wherein a flexible band is attached to the said movable clamp with said wedge shaped jaw and extends past the wedge to prevent, the downward clamping force from acting against the work piece.

10. The system according to claim 1 and wherein said actuator is configured to fit within the underneath supporting structure said channel and used to apply force against said wedge shaped jaw to cause power clamping; compressed air or hydraulic fluid and is transferred to and from the actuator through flexible tubes which automatically compensate for length variations caused by repositioning the said movable clamp; the actuator is provided with a lever to amplify the force imposed by available hydraulic or pneumatic pressure acting against a piston, as necessary to create sufficient clamping force.

11. The system according to claim 4 and wherein; the said movable clamping wedge is provided with spring detends used to secure work pieces before and after clamping.

12. The system according to claim 4 and wherein; the clamping wedge is caused to clamp by rotation of a threaded rod into a threaded nut located in the underneath supporting structure said channel and if power clamping is used, a hand knob may be used to secure work pieces before and after power clamping.

13. The system according to claim 1 and wherein compressed air can be coupled and de-coupled to a pallet clamping system from a compressed air source and the compressed air is used to clean the coupling surface before mating and any air leakage resulting from imperfect mating can be detected by a pressure drop and a check valve is used to prevent air escapement from the pallet when the compressed air supply is de-coupled; compressed air is stored in the pallet which is connected to said base an and said underneath supporting structure channel and used to enable limited clamping and unclamping when the compressed air source is removed; a three way valve is used to transfer compressed air to a clamp or clamps for clamping and vents this air to atmosphere for un-clamping.

14. The system according to claim 1 and wherein flexible T-slot covers are telescoping and spring into openings provided by the wear rails and they consist of an inner section and an outer section that slides over the inner section and the covers are provided in multiple lengths so said t-slot covers can cover the shortest to the longest distance needed.

15. The system according to claim 1 and wherein said system comprising a slide down clamp guided by the wear rails; said slide down clamp provides force perpendicular to the wear rails for clamping a work piece from the top; the clamp retracts away from the work piece when not actuated; said slide down clamp having a piston which is powered by air pressure that provides the vertical and horizontal slide down motion; the piston is fastened to a rectangular shaft that extends down, below the wear rails and into the channel where said shaft is guided by a bearing and receives compressed air by an air line that is connected to a three way valve located at the end of the system; the air is transmitted to a top of said piston; the air pressure forces the piston down causing said movable clamp to move down and forward by a cam action of rollers guided by two members fastened to a top of said slide down clamp housing; a bearing is located at the top of the slide down housing to guide and seal the top of the piston; when the air pressure is relieved springs retract to the piston causing the clamp to return to an original position.

16. The system according to claim 1 wherein said system is further comprising are a locator/clamp to serve a purpose of both; the taper wedge is axially adjusted with respect to the locater clamp housing to enable the taper wedge to contact the work piece that is to be clamped; the taper wedge is axially guided by the locater clamp housing and wedge housing and is adjusted by two set screws, when adjusted the wedge housing and the locator clamp housing are bolted to the station.

* * * * *